US009879756B2

(12) United States Patent
Wu

(10) Patent No.: US 9,879,756 B2
(45) Date of Patent: Jan. 30, 2018

(54) LINK UNIT

(71) Applicant: KMC Chain Industrial Co., Ltd., Tainan (TW)

(72) Inventor: Daniel Wu, Tainan (TW)

(73) Assignee: KMC CHAIN INDUSTRIAL CO., LTD., Tainan (TW)

( * ) Notice: Subject to any disclaimer, the term of this patent is extended or adjusted under 35 U.S.C. 154(b) by 54 days.

(21) Appl. No.: 15/019,158

(22) Filed: Feb. 9, 2016

(65) Prior Publication Data

US 2016/0230840 A1 Aug. 11, 2016

(30) Foreign Application Priority Data

Feb. 11, 2015 (TW) .............................. 104104550 A

(51) Int. Cl.
F16G 15/10 (2006.01)
F16G 13/02 (2006.01)
F16G 15/00 (2006.01)
F16G 13/06 (2006.01)
F16G 13/07 (2006.01)

(52) U.S. Cl.
CPC .............. *F16G 13/06* (2013.01); *F16G 13/07* (2013.01)

(58) Field of Classification Search
CPC .......... F16G 13/06; F16G 13/02; F16G 15/00; B65G 17/38; B65G 2201/06
USPC .......................... 474/218, 219, 206, 220, 227
See application file for complete search history.

(56) References Cited

U.S. PATENT DOCUMENTS

| 237,771 | A | * | 2/1881 | Paine | ...................... | F16G 13/02 |
| | | | | | | 474/227 |
| 282,536 | A | * | 8/1883 | Legg | ....................... | F16G 13/02 |
| | | | | | | 474/227 |
| 610,583 | A | * | 9/1898 | Fox | .......................... | F16G 13/06 |
| | | | | | | 139/333 |
| 610,751 | A | * | 9/1898 | Wood | ...................... | F16G 13/02 |
| | | | | | | 474/227 |
| 628,386 | A | * | 7/1899 | Berry et al. | ............ | F16G 13/06 |
| | | | | | | 474/220 |

(Continued)

FOREIGN PATENT DOCUMENTS

GB 2011015 A 7/1979
TW 545536 U 8/2003

(Continued)

OTHER PUBLICATIONS

Search Report issued to European counterpart application No. 16154178.4 by the EPO dated Jul. 18, 2016.

*Primary Examiner* — Henry Y Liu
(74) *Attorney, Agent, or Firm* — Husch Blackwell LLP

(57) ABSTRACT

A link unit includes two outer chain plates and an assembling pin. Each of the outer chain plates has a first end section, and a second end section spaced apart from the first end section. The first end section of each of the outer chain plates has a through hole. The second end section of each of the outer chain plates has a connecting hole that has a first hole portion, a second hole portion, and a neck portion located between the first and second hole portions. The assembling pin is inserted removably through the connecting hole of each of the outer chain plates, and is capable of being prevented from moving past the neck portion of each of the outer chain plates so as to be positioned in the second hole portion of each of the outer chain plates.

9 Claims, 16 Drawing Sheets

(56) References Cited

U.S. PATENT DOCUMENTS

| | | | | |
|---|---|---|---|---|
| 664,256 A * | 12/1900 | Gates | ............... | F16G 13/02 474/227 |
| 758,913 A * | 5/1904 | Hampton | ............... | F16G 13/02 474/227 |
| 781,741 A * | 2/1905 | Rogers | ............... | F16G 13/02 474/219 |
| 818,469 A * | 4/1906 | Rogers | ............... | F16G 13/06 474/227 |
| 826,991 A * | 7/1906 | Christ | ............... | B65G 19/10 198/728 |
| 891,189 A * | 6/1908 | Schmidt, Jr. | ............... | F16G 13/06 305/59 |
| 1,109,808 A * | 9/1914 | Wilmot | ............... | F16G 13/02 411/549 |
| 1,326,171 A * | 12/1919 | Berry | ............... | F16G 13/02 474/227 |
| 1,372,689 A * | 3/1921 | Helwig | ............... | B65G 17/38 474/227 |
| 1,397,131 A * | 11/1921 | Law | ............... | B65G 17/38 474/227 |
| 1,453,088 A * | 4/1923 | Bachman | ............... | F16G 13/02 474/227 |
| 1,557,172 A * | 10/1925 | Klein | ............... | B65G 17/38 474/227 |
| 1,570,440 A * | 1/1926 | Holmes | ............... | F16G 13/06 474/218 |
| 1,589,201 A * | 6/1926 | Meier | ............... | F16G 13/02 474/227 |
| 1,602,927 A * | 10/1926 | O'Neil | ............... | F16G 13/02 474/227 |
| 1,694,746 A * | 12/1928 | Landahl | ............... | B65G 17/385 198/851 |
| 2,546,368 A * | 3/1951 | McIntosh | ............... | F16G 13/06 474/227 |
| 2,568,650 A * | 9/1951 | McIntosh | ............... | F16G 13/06 474/227 |
| 2,631,465 A * | 3/1953 | Cordis | ............... | A01K 1/0128 198/731 |
| 2,638,009 A * | 5/1953 | Beveridge | ............... | F16G 13/02 474/227 |
| 2,687,651 A * | 8/1954 | Webb | ............... | F16G 13/07 474/227 |
| 4,041,790 A * | 8/1977 | Paul | ............... | F16G 13/06 474/220 |
| 4,043,215 A * | 8/1977 | Long | ............... | F16G 13/06 474/218 |
| 4,863,418 A * | 9/1989 | Fillar | ............... | F16G 13/02 474/207 |
| 5,178,585 A * | 1/1993 | Lin | ............... | F16G 13/06 474/206 |
| 5,186,569 A * | 2/1993 | Wu | ............... | F16G 13/06 403/154 |
| 5,291,730 A * | 3/1994 | Wu | ............... | F16G 15/00 474/220 |
| 5,299,416 A * | 4/1994 | Wu | ............... | F16G 15/02 474/218 |
| 5,305,594 A * | 4/1994 | Wang | ............... | F16G 15/02 474/206 |
| 5,362,282 A * | 11/1994 | Lickton | ............... | F16G 15/02 474/220 |
| 5,400,585 A * | 3/1995 | Wang | ............... | F16G 13/06 474/206 |
| 5,966,923 A * | 10/1999 | Nakamura | ............... | B65G 17/38 198/851 |
| 6,110,064 A * | 8/2000 | Guichard | ............... | F16G 13/06 474/230 |
| 6,244,032 B1 * | 6/2001 | Christmas | ............... | F16G 13/06 474/220 |
| 6,390,943 B1 * | 5/2002 | Dreger | ............... | F16G 13/06 474/220 |
| 7,131,258 B2 * | 11/2006 | Meggiolan | ............... | F16G 13/06 474/206 |
| 7,427,251 B2 * | 9/2008 | Reiter | ............... | F16G 13/06 474/206 |
| 7,543,437 B1 * | 6/2009 | Chin | ............... | F16G 13/06 474/218 |
| 7,712,298 B1 * | 5/2010 | Wang | ............... | F16G 15/14 474/218 |
| 7,722,492 B2 * | 5/2010 | Santos | ............... | F16G 15/00 474/206 |
| 7,837,584 B2 * | 11/2010 | Wu | ............... | F16G 13/06 474/218 |
| 7,914,410 B2 * | 3/2011 | Oishi | ............... | F16G 13/06 474/220 |
| 8,540,597 B2 * | 9/2013 | Wang | ............... | F16G 13/06 403/118 |
| 9,341,237 B2 * | 5/2016 | Kubota | ............... | F16G 15/04 |
| 9,494,216 B2 * | 11/2016 | Fukumori | ............... | F16G 15/04 |
| 2002/0173395 A1 * | 11/2002 | Reiter | ............... | F16G 13/06 474/231 |
| 2007/0197333 A1 * | 8/2007 | Santos | ............... | F16G 15/00 474/227 |
| 2007/0249448 A1 * | 10/2007 | Wu | ............... | F16G 15/00 474/206 |
| 2007/0249449 A1 * | 10/2007 | Wu | ............... | F16G 13/02 474/206 |
| 2008/0081720 A1 * | 4/2008 | Oishi | ............... | F16G 13/06 474/227 |
| 2009/0247339 A1 * | 10/2009 | Chin | ............... | F16G 13/06 474/206 |
| 2011/0028255 A1 * | 2/2011 | Chin | ............... | F16G 13/06 474/227 |
| 2011/0081195 A1 | 4/2011 | Wang | | |
| 2015/0260258 A1 * | 9/2015 | Kubota | ............... | F16G 13/06 474/227 |
| 2015/0260260 A1 * | 9/2015 | Fukumori | ............... | F16G 13/06 474/227 |

FOREIGN PATENT DOCUMENTS

| | | |
|---|---|---|
| TW | M345062 U | 11/2008 |
| TW | 201018807 A | 5/2010 |
| TW | 201042182 A | 12/2010 |

* cited by examiner

LINK UNIT

CROSS-REFERENCE TO RELATED APPLICATION

This application claims priority of Taiwanese Application No. 104104550, filed on Feb. 11, 2015.

FIELD

The disclosure relates to a link unit of a chain, and more particularly to a link unit of a chain that is easy to be reassembled.

BACKGROUND

A conventional chain includes chain plates, rollers, bushes and chain pins. Generally, the components of the conventional chain are assembled in the factory, and are difficult to be reassembled by an end-user. For example, two end portions of each of the chain pins are riveted by a riveting machine in the factory for holding two corresponding pairs of chain plates together. It is difficult for the end-user to reassemble the chain pins and the chain plates without the riveting machine.

Referring to FIG. 16, a link unit 7 of another conventional chain includes two chain plates 71 and two chain pins 72. Each of the chain plates 71 has a circular through hole 711, and a connecting hole 712 that is spaced apart from the through hole 711. Each of the chain pins 72 has opposite first and second end portions 721, 722. The first end portion 721 of each of the chain pins 72 is inserted through the through hole 711 of a respective one of the chain plates 71 and riveted to the respective one of the chain plates 71 in advance. To assemble the link unit 7 of the conventional chain, an end user needs to simultaneously and respectively aligned the chain pins 72 with the connecting holes 712 of the chain plates 71 in order to engage the second end portion 722 of each of the chain pins 72 with the connecting hole 712 of the other one of the chain plates 71. In addition to the laborious assembling operation, the chain plates 71 of the link unit 7 of the conventional chain are easy to be moved relative to each other accidentally, so as to unwantedly disassemble the link unit 7.

SUMMARY

Therefore, an object of the disclosure is to provide a link unit that can overcome the aforesaid drawback associated with the prior art.

According to one aspect of the disclosure, the link unit includes two spaced-apart outer chain plates and an assembling pin. Each of the outer chain plates has a first end section, a second end section that is spaced apart from the first end section, an inner side surface that faces the other one of the outer chain plates, and an outer side surface that is opposite to the inner side surface. The first end section of each of the outer chain plates has a through hole. The second end section of each of the outer chain plates has a connecting hole that has a first hole portion, a second hole portion, and a neck portion located between the first and second hole portions. The assembling pin is inserted removably through the connecting hole of each of the outer chain plates, and is capable of being prevented from moving past the neck portion of each of the outer chain plates so as to be positioned in the second hole portion of each of the outer chain plates.

According to another aspect of the disclosure, the link unit includes two spaced-apart outer chain plates and two assembling pins. Each of the outer chain plates has a first end section, a second end section that is spaced apart from the first end section, an inner side surface that faces the other one of the outer chain plates, an outer side surface that is opposite to the inner side surface, and two connecting holes that are respectively formed in the first and second end sections of the outer chain plate. Each of the connecting holes of each of the outer chain plates has a first hole portion that is proximate to the other one of the connecting holes of the outer chain plate, a second hole portion that is distal from the other one of the connecting holes of the outer chain plate, and a neck portion located between the first and second hole portions of the connecting hole. The assembling pins are inserted respectively and removably through the connecting holes of each of the outer chain plates. Each of the assembling pins are capable of being prevented from moving past the corresponding neck portion of each of the outer chain plates so as to be positioned in the corresponding second hole portion of each of the outer chain plates.

BRIEF DESCRIPTION OF THE DRAWINGS

Other features and advantages of the disclosure will become apparent in the following detailed description of the embodiments with reference to the accompanying drawings, of which.

Figure 1:
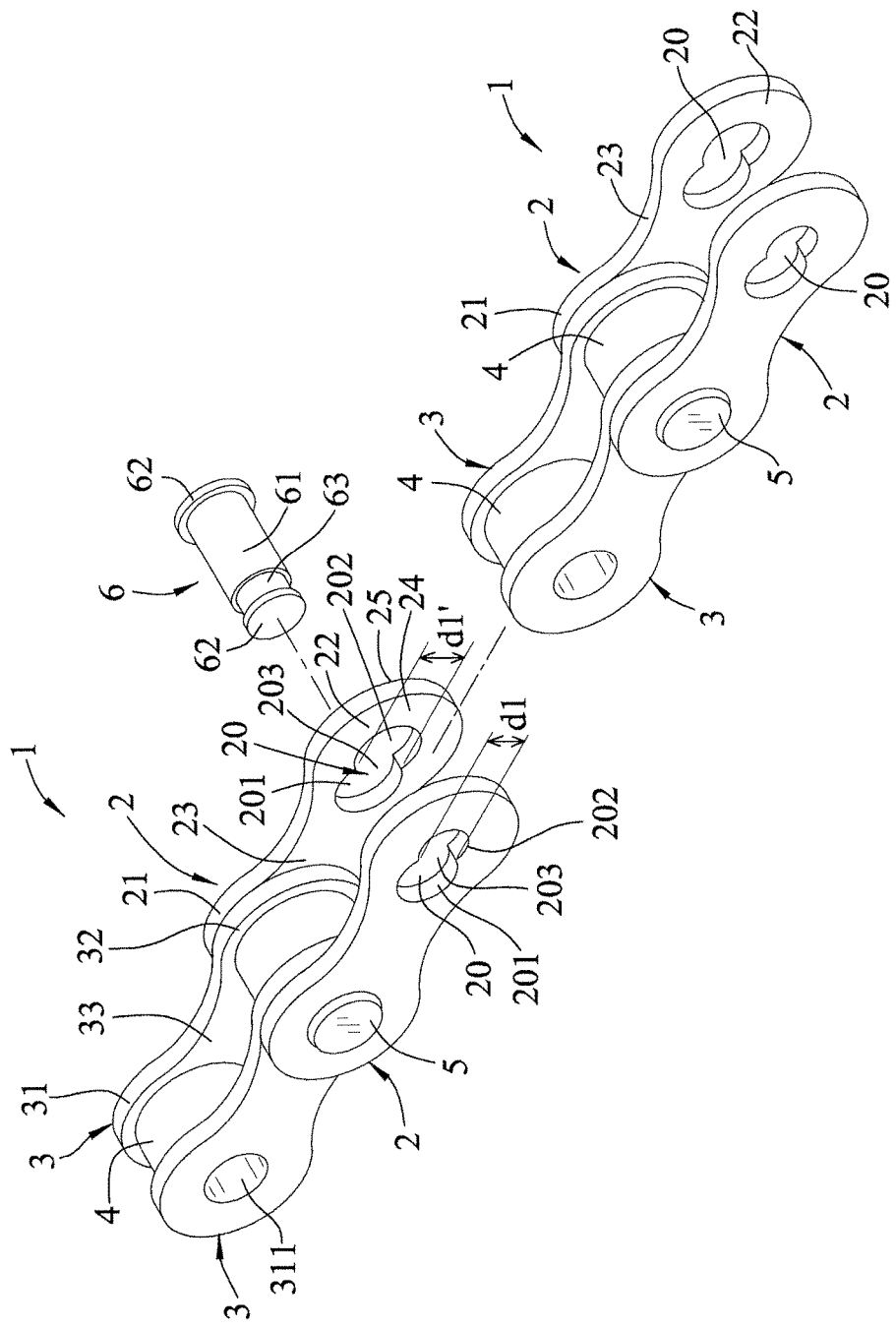
FIG. 1 is a partly exploded perspective view of a chain including two first embodiments of the link unit according to the disclosure.
Figure 2:
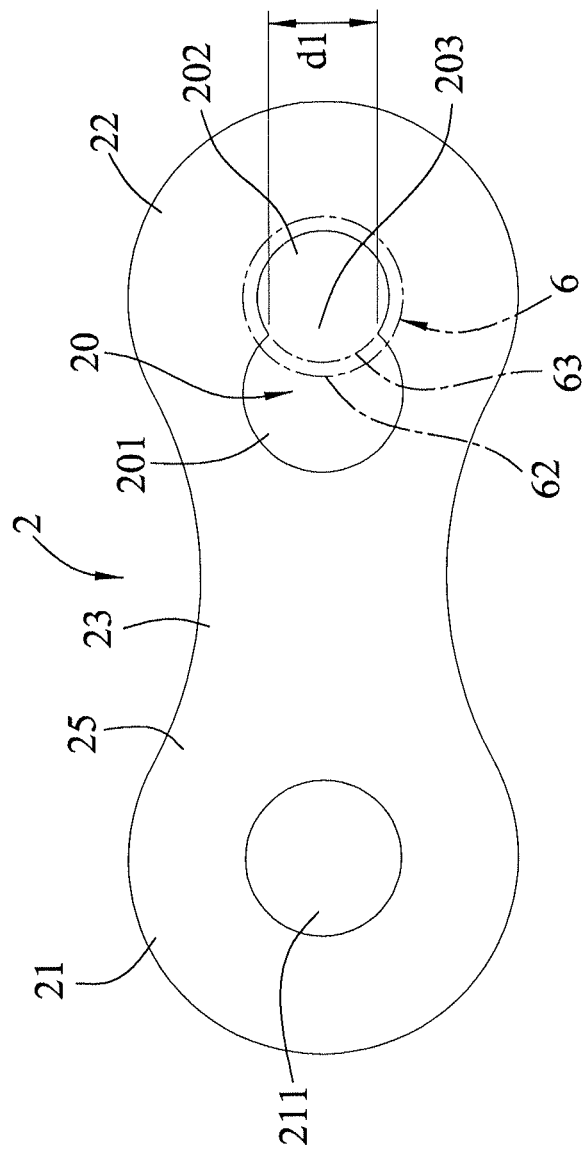
FIG. 2 is a side view of an outer chain plate of the first embodiment.
Figure 4:
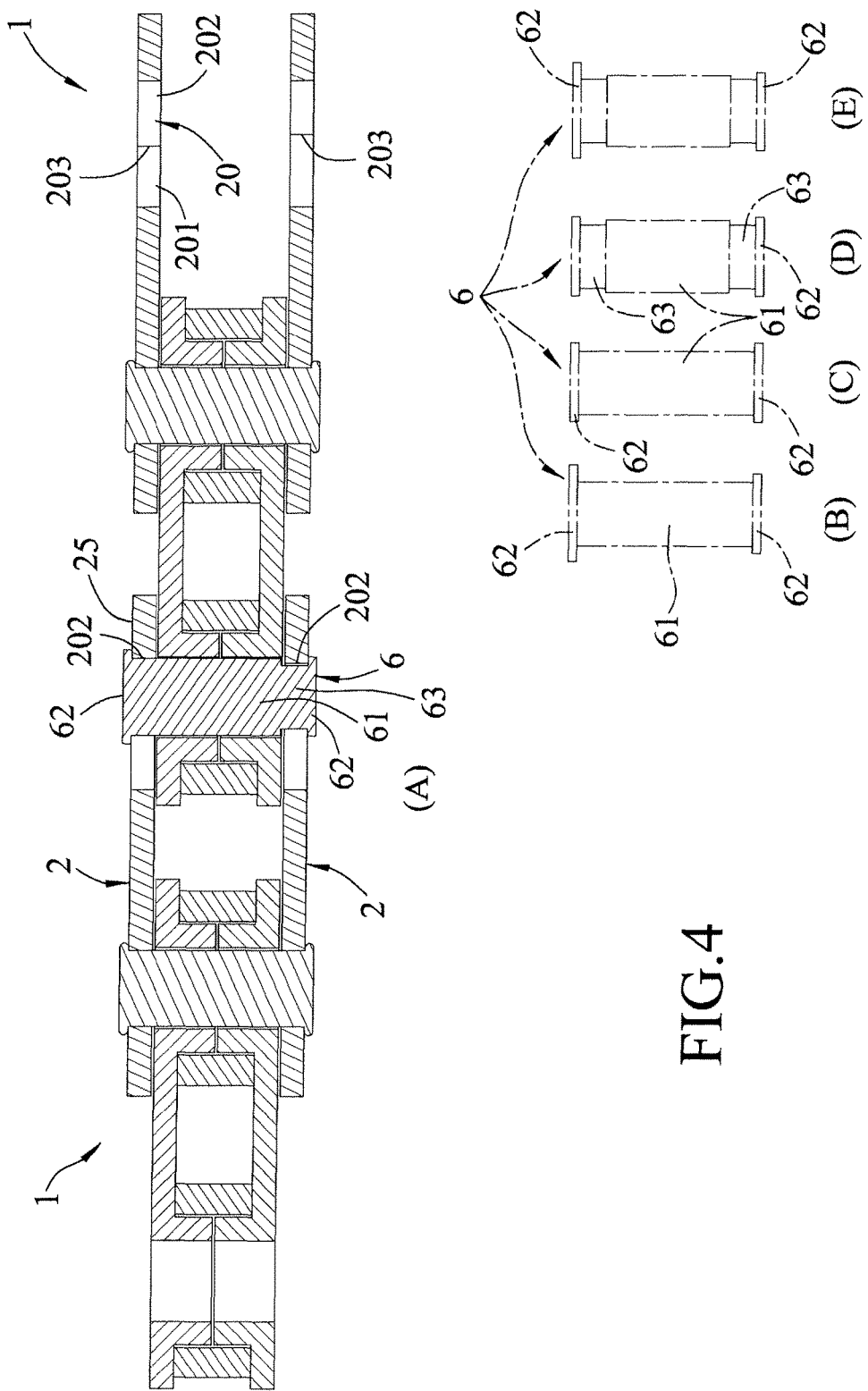
Figure 5:
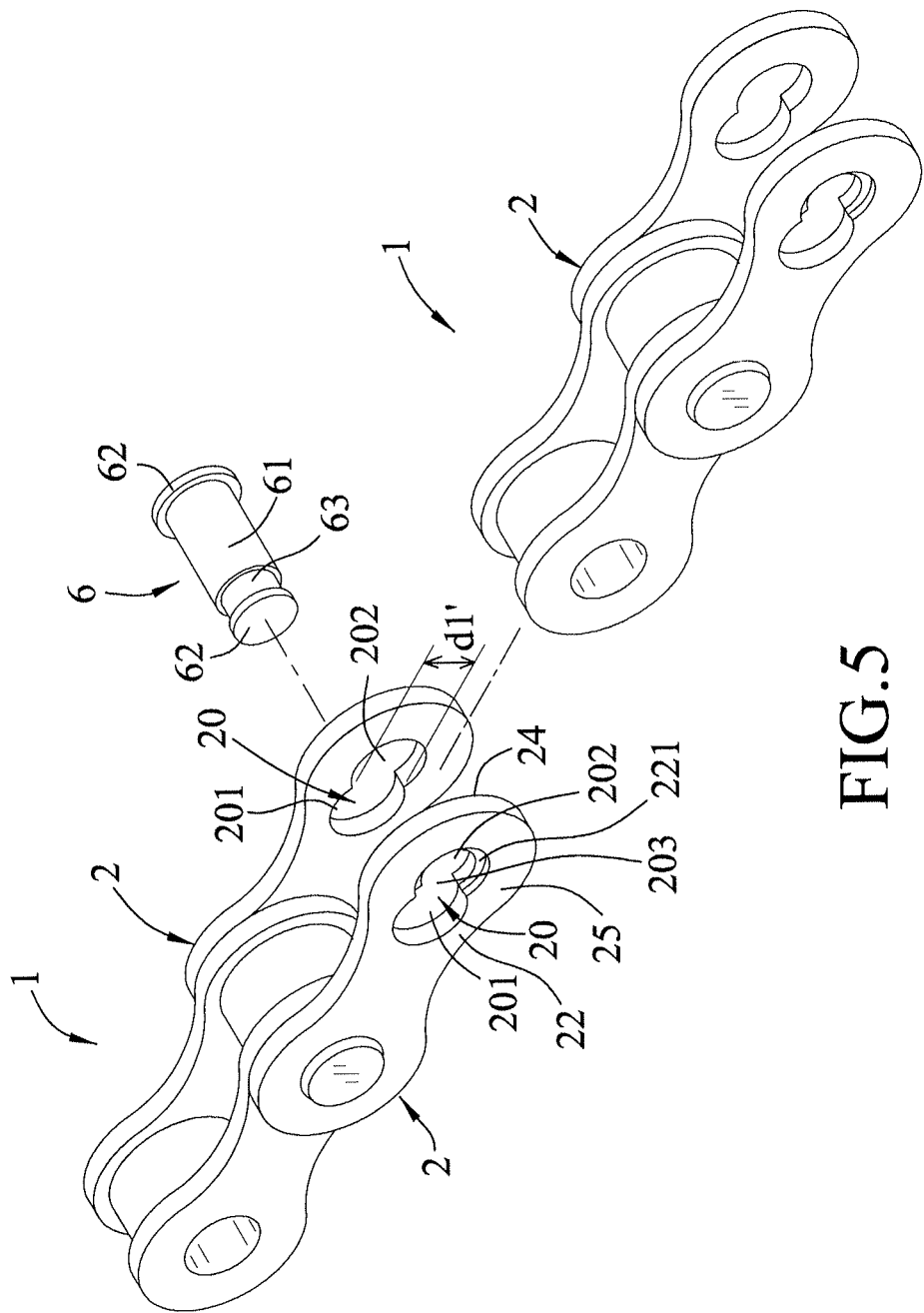
Figure 6:
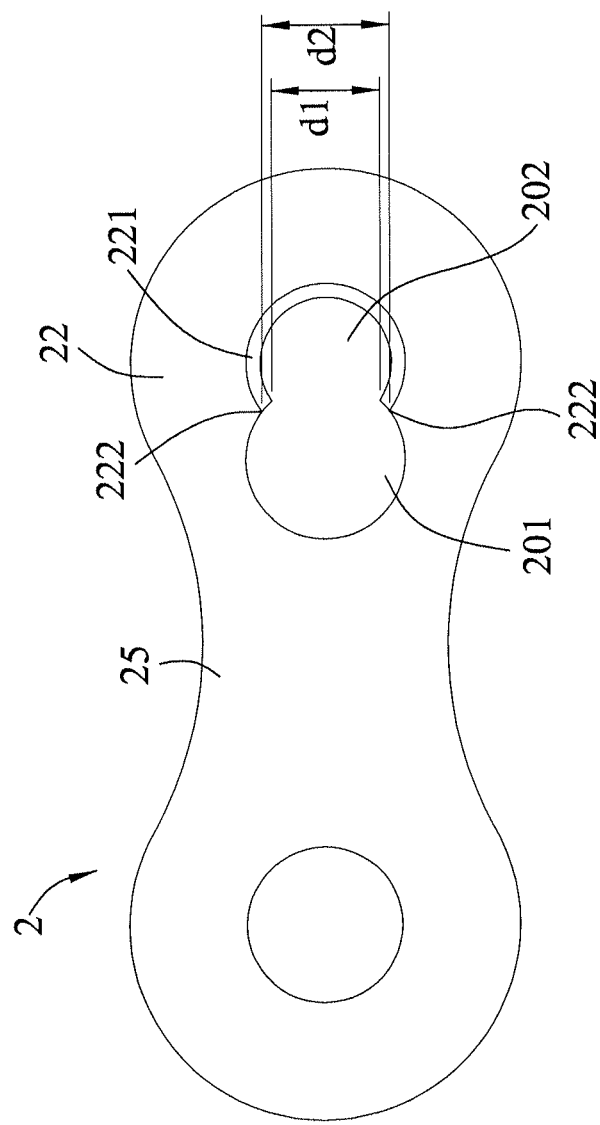
Figure 7:
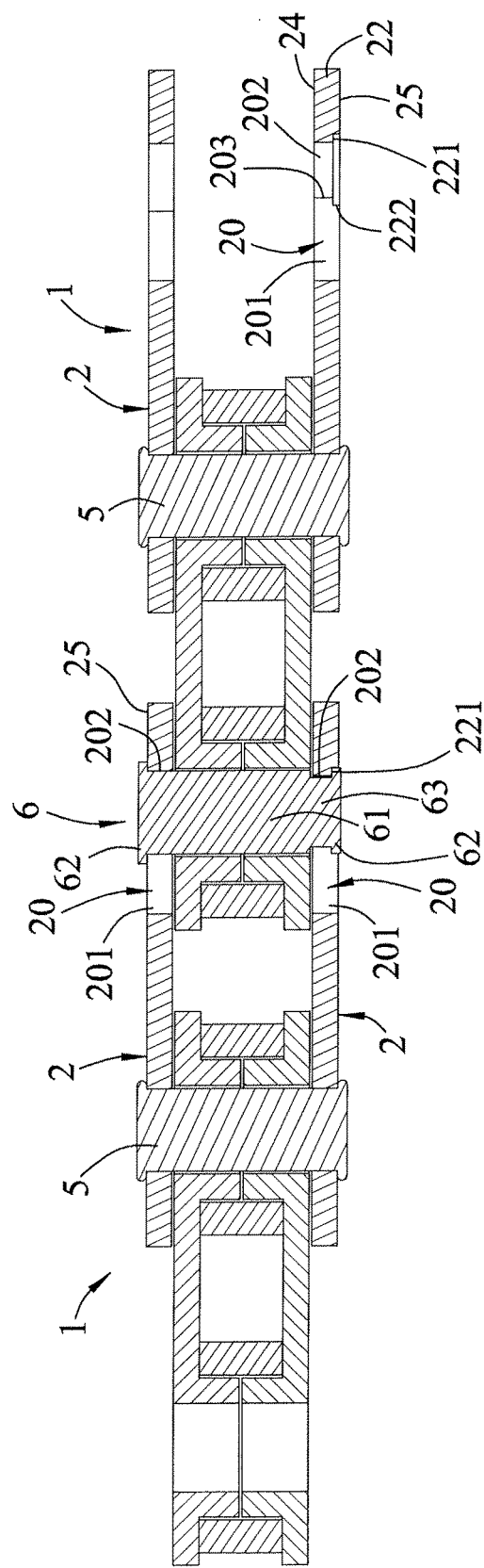
Figure 8:
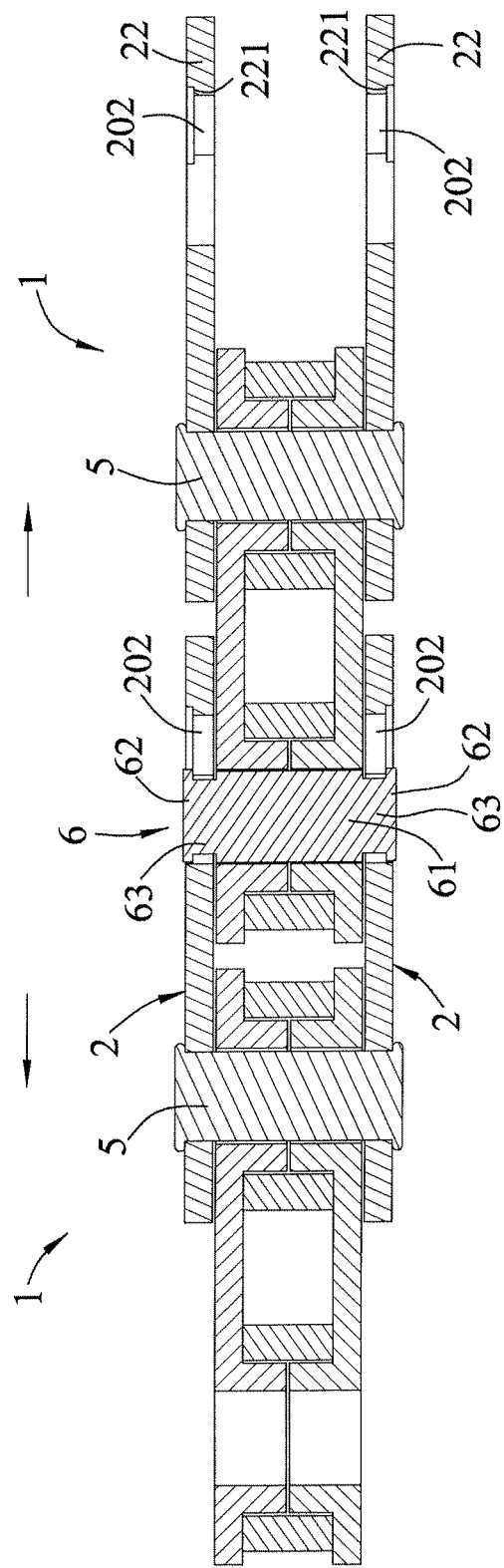
Figure 9:
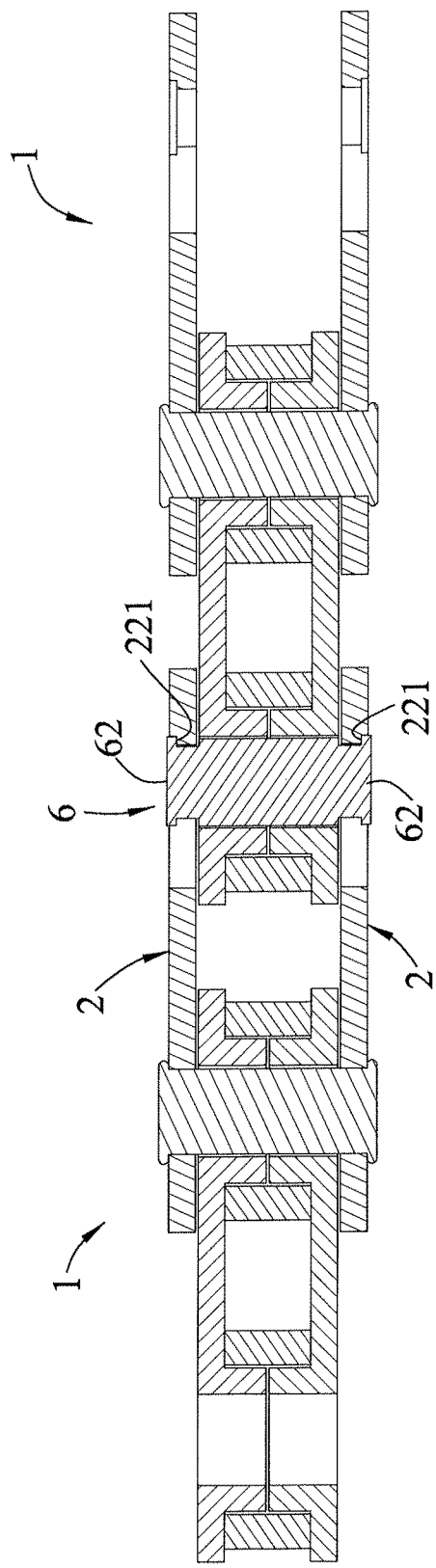
Figure 10:
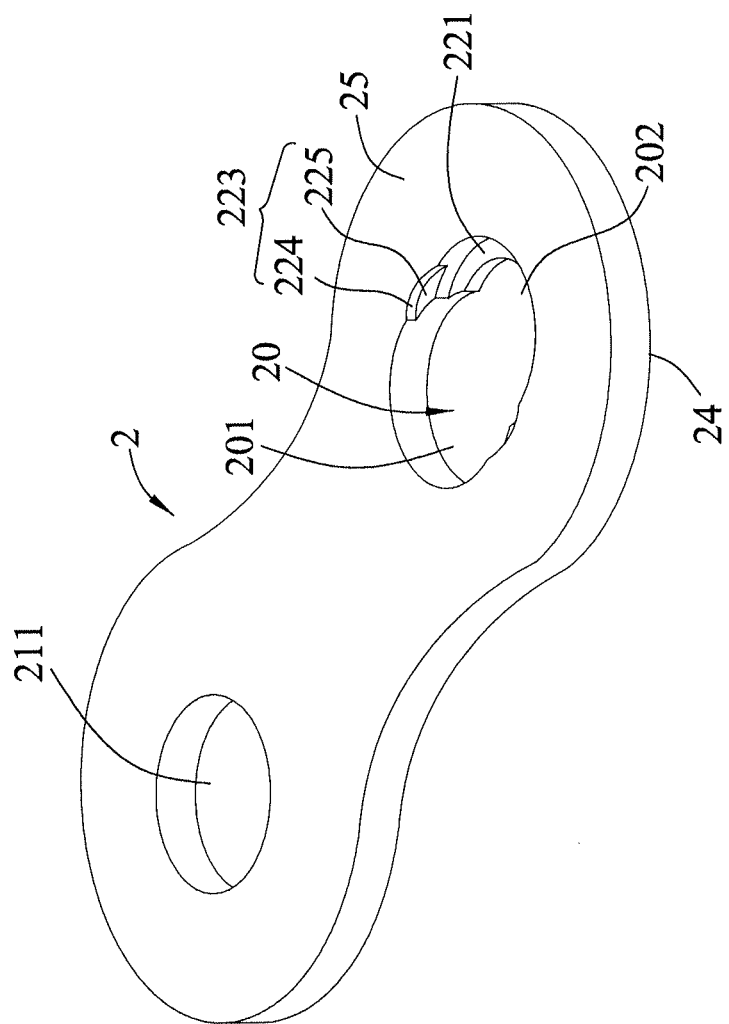
Figure 11:
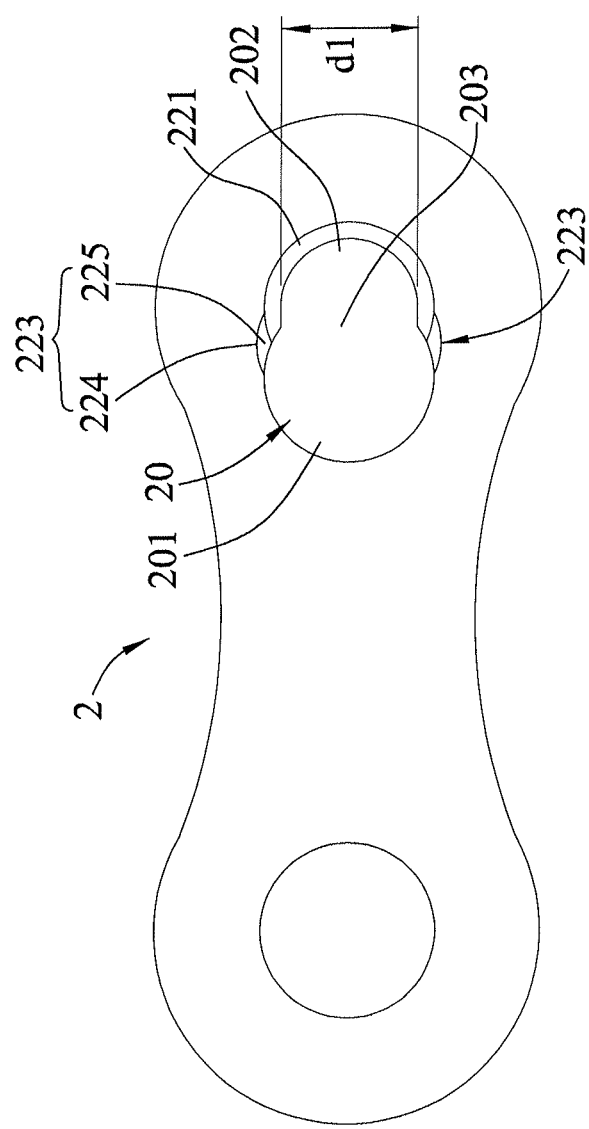
Figure 12:
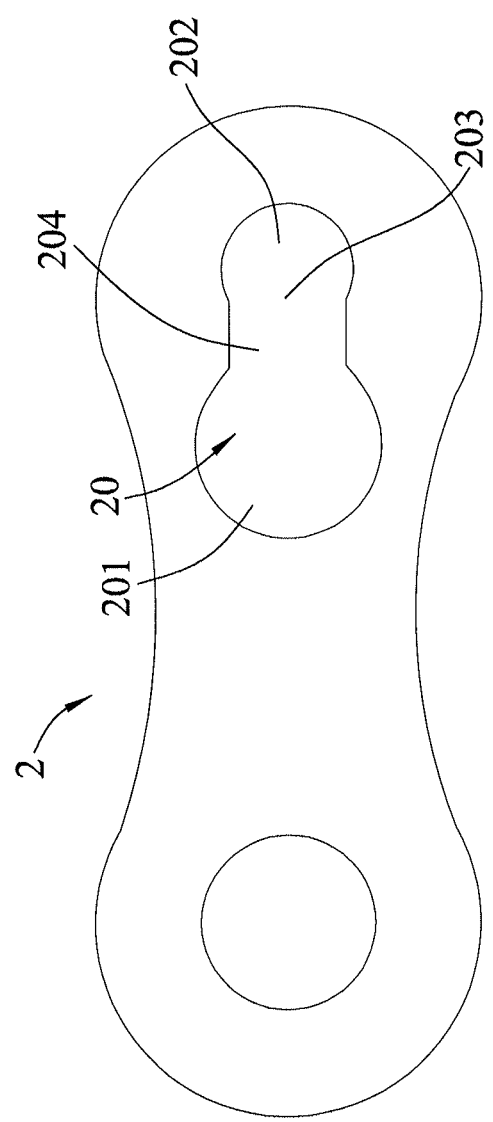
Figure 13:
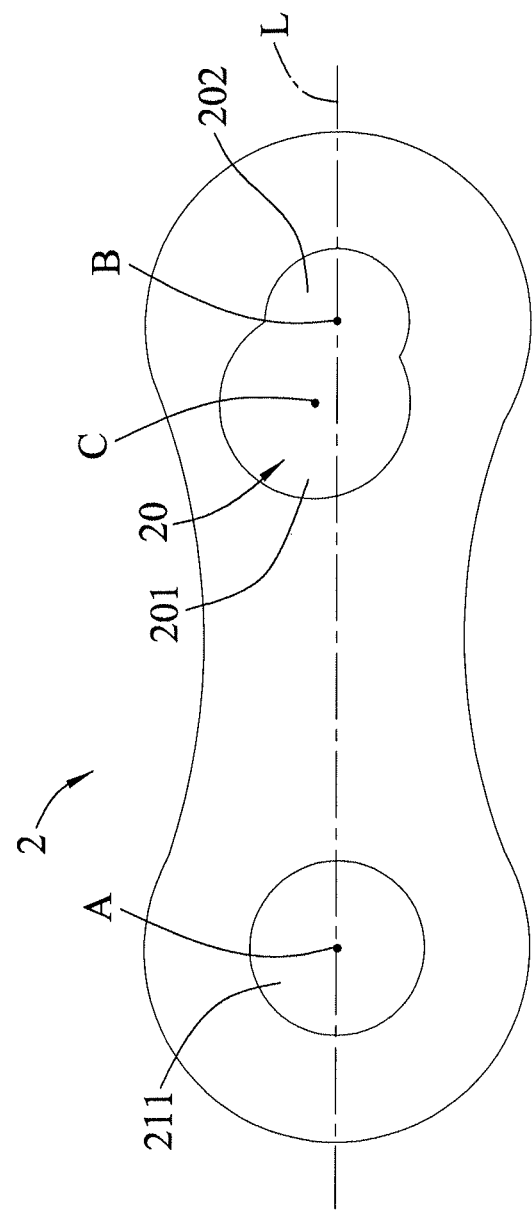
Figure 14:
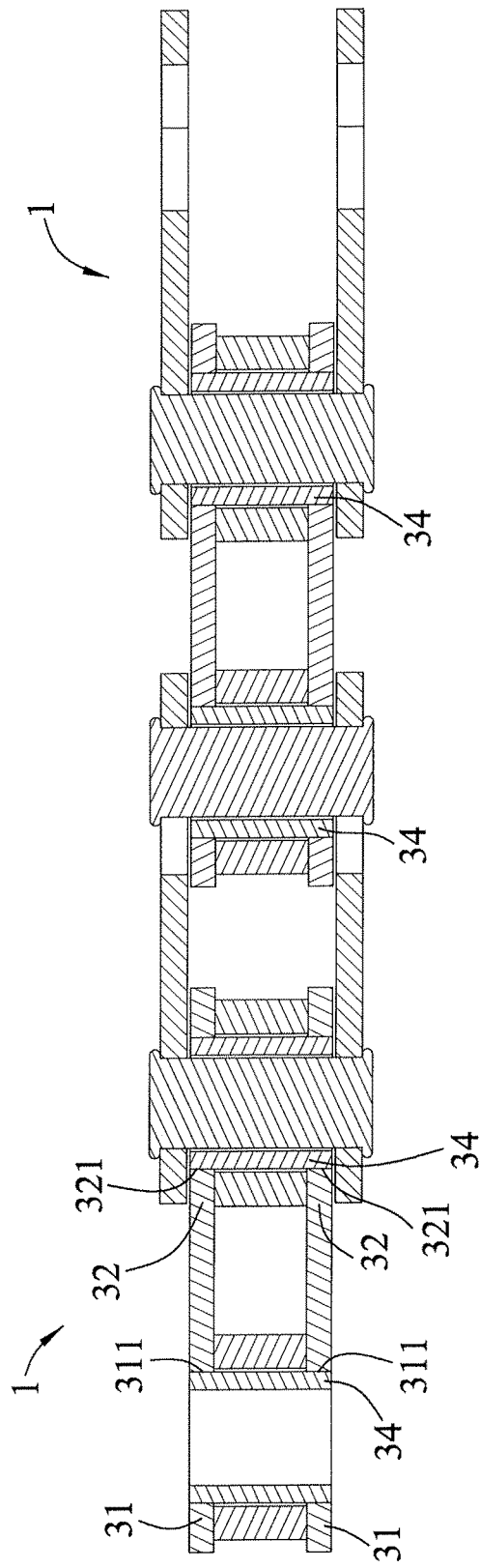
Figure 15:
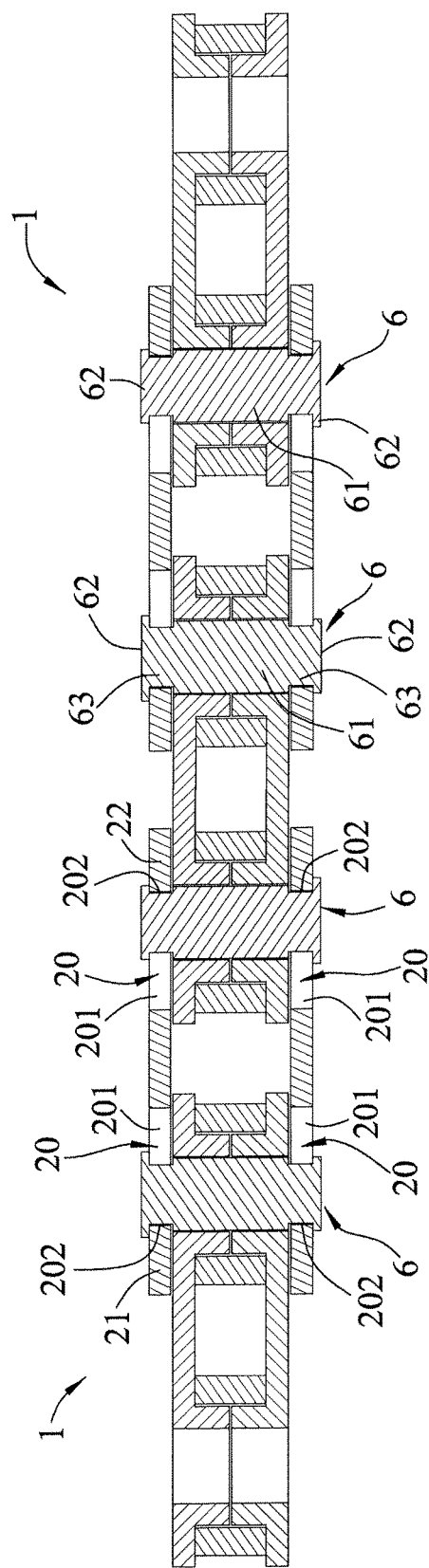
Figure 16:
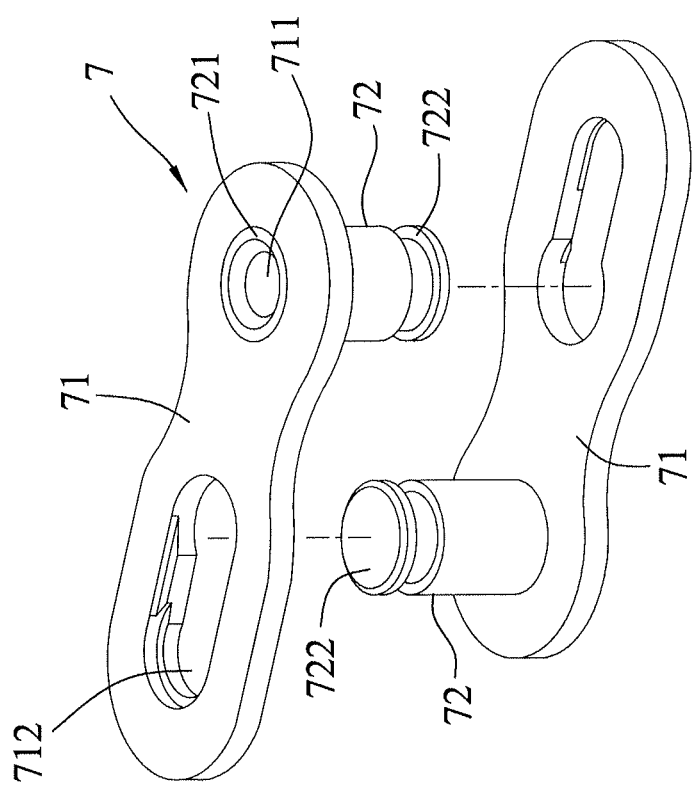

Part (A) of FIG. 4 is an assembled sectional view of the chain in FIG. 1;

Parts (B) to (E) of FIG. 4 illustrate four variations of an assembling pin of the first embodiment;

FIG. 5 is a partly exploded perspective view of a chain including two second embodiments of the link unit according to the disclosure, illustrating an assembling process of the chain;

FIG. 6 is a side view of an outer chain plate of the second embodiment;

FIG. 7 is an assembled sectional view of the chain in FIG. 5;

FIG. 8 is a schematic sectional view of a chain including two third embodiments, illustrating an assembling process of the chain;

FIG. 9 is an assembled sectional view of the chain in FIG. 8;

FIG. 10 is a perspective view of an outer chain plate of a fourth embodiment of the link unit according to the disclosure;

FIG. 11 is a side view of the outer chain plate of the fourth embodiment;

FIG. 12 is a side view of an outer chain plate of a fifth embodiment of the link unit according to the disclosure;

FIG. 13 is a side view of an outer chain plate of a sixth embodiment of the link unit according to the disclosure;

FIG. 14 is an assembled sectional view of a chain including two seventh embodiments of the link unit according to the disclosure;

FIG. 15 is an assembled sectional view of a chain including two eighth embodiments of the link unit according to the disclosure; and FIG. 16 is a partly exploded perspective view of a link unit of a conventional chain.

DETAILED DESCRIPTION

Before the disclosure is described in greater detail, it should be noted that like elements are denoted by the same reference numerals throughout the disclosure.

Referring to FIGS. 1 to 4, a chain is shown to include two first embodiments of the link unit 1 according to the disclosure. The first embodiment of the link unit 1 includes two spaced-apart outer chain plates 2, two spaced-apart inner chain plates 3, two roller members 4, a connecting pin 5 and an assembling pin 6.

Each of the outer chain plates 2 has a first end section 21, a second end section 22, a waist section 23 connected between the first end section 21 and the second end section 22, an inner side surface 24 facing the other one of the outer chain plates 2, and an outer side surface 25 opposite to the inner side surface 24. The first end section 21 of each of the outer chain plates 2 has a through hole 211 that is formed through the inner and outer side surfaces 24, 25 of the outer chain plate 2. The second end section 22 of each of the outer chain plates 2 has a connecting hole 20 that is formed through the inner and outer side surfaces 24, 25 of the outer chain plate 2 and that is spaced apart from the through hole 211 of the outer chain plate 2.

The connecting hole 20 of each of the outer chain plates 2 has a first hole portion 201, a second hole portion 202, and a neck portion 203 located between the first and second hole portions 201, 202. With particular reference to FIG. 1, the width of the neck portion 203 of the connecting hole 20 of one of the outer chain plates 2 is d1. The width of the neck portion 203 of the connecting hole 20 of the other one of the outer chain plates 2 is d1'. In this embodiment, d1' is greater than d1. For the connecting hole 20 of the one of the outer chain plates 2, the first hole portion 201 has a diameter greater than that of the second hole portion 202. For the connecting hole 20 of the other one of the outer chain plates 2, the first hole portion 201 has a diameter substantially the same as that of the second hole portion 202. The first and second hole portions 201, 202 of each of the outer chain plates 2 are aligned respectively with the first and second hole portions 201, 202 of the other one of the outer chain plates 2.

Each of the inner chain plates 3 has a first end section 31, a second end section 32, and a waist section 33 connected between the first end section 31 and the second end section 32. The second end sections 32 of the inner chain plates 3 are disposed between the first end sections 21 of the outer chain plates 2. The first end section 31 of each of the inner chain plates 3 has a first through hole 311 that is formed therethrough, and a first annular flange 312 that surrounds the first through hole 311 and that extends toward the first end section 31 of the other one of the inner chain plates 3. The second end section 32 of each of the inner chain plates 3 has a second through hole 321 that is formed therethrough, and a second annular flange 322 that surrounds the second through hole 321 and that extends toward the second end section 32 of the other one of the inner chain plates 3.

The roller members 4 are located between the first end sections 31 of the inner chain plates 3 and between the second end sections 32 of the inner chain plates 3. The connecting pin 5 extends through the first end sections 21 of the outer chain plates 2 and the second end sections 32 of the inner chain plates 3, and has opposite end portions that hold the first end sections 21 of the outer chain plates 2 together by being riveted, or in other manners.

The assembling pin 6 extends through the connecting holes 20 of the outer chain plates 2, and has a main pin body 61 having a diameter slightly greater than the width (d1') of the neck portion 203 of the connecting hole 20 of the other one of the outer chain plates 2, a neck section 63 that is connected to one longitudinal end of the main pin body 61 and that has a diameter smaller than that of the main pin body 61, and two end sections 62 that are connected respectively to an end of the neck section 63 distal from the main pin body 61 and the other longitudinal end of the main pin body 61 distal from the neck section 63. The neck section 63 is located within the connecting hole 20 of the one of the outer chain plates 2, and has a diameter slightly greater than the width (d1) of the neck portion 203 of the connecting hole 20 of the one of the outer chain plates 2. The assembling pin 6 is made of a material such that it can be moved forcibly past the neck portion 203 so as to move from the first hole portion 201 into the second hole portion 202. The first hole portion 201 of the connecting hole 20 of each of the outer chain plates 2 has a diameter greater than that of the main pin body 61 of the assembling pin 6 and that of the end section 62 of the assembling pin 6 connected to the neck section 63 for permitting the main pin body 61 and said end section 62 of the assembling pin 6 to be inserted therethrough. The diameter of the end section 62 of the assembling pin 6 connected to the neck section 63 is greater than the diameter of the second hole portion 202 of the one of the outer chain plates 2. The diameter of the end section 62 of the assembling pin 6 distal from the neck section 63 is greater than the diameter of the second hole portion 202 of the other one of the outer chain plates 2, is greater than the diameter of the main pin body 211, and is greater than the diameter of the first hole portion 201 of the connecting hole 20 of each of the outer chain plates 2, such that said end section 62 is prevented from being inserted into the first hole portion 201 of the connecting hole 20 of each of the outer chain plates 2 in order to facilitate an assembling process of this disclosure.

The outer chain plates 2, the inner chain plates 3, the roller members 4 and the connecting pin 5 of the link unit 1 are assembled in advance. To interconnect two link units 1 of this disclosure, the first end sections 31 of the inner chain plates 3 of one of the link units 1 are first disposed between the second end sections 22 of the outer chain plates 2 of the other one of the link units 1. Then, the assembling pin 6 is inserted through the first hole portion 201 of the connecting hole 20 of each of the outer chain plates 2 of the other one of the link units 1, the first through hole 311 and the first annular flange 312 of each of the inner chain plates 3 of the one of the link units 1 such that the neck section 63 of the assembling pin 6 is retained within the first hole portion 201 of the one of the outer chain plates 2 of the other one of the link units 1. Finally, the link units 1 are pulled away from each other (see the arrows in FIG. 3) so that, the neck section 63 of the assembling pin 6 is moved forcibly past the neck portion 203 of the one of the outer chain plates 2 of the other one of the link units 1 and into the corresponding second hole portion 202, an end of the main pin body 61 of the assembling pin 6 distal from the neck section 63 is moved forcibly past the neck portion 203 of the other one of the outer chain plates 2 of the other one of the link units 1 and into the corresponding second hole portion 202, and the end sections 62 of the assembling pin 6 respectively abut against the outer side surfaces 25 of the outer chain plates 2 of the other one of the link units 1.

After the assembly of the link units 1, the end of the main pin body 61 of the assembling pin 6 distal from the neck section 63 is prevented from moving past the neck portion 203 of the other one of the outer chain plates 2 of the other one of the link units 1 so as to be positioned in the corresponding second hole portion 202, and the neck section 63 of the assembling pin 6 is prevented from moving past the neck portion 203 of the one of the outer chain plates 2 of the other one of the link units 1 so as to be positioned in the corresponding second hole portion 202.

It should be noted that the outer chain plates 2, the inner chain plates 3, the roller members 4 and the connecting pin 5 of the link unit 1 are assembled by the provider/seller in advance, so that an end-user can easily assemble or disassemble a plurality of the link units 1 of this disclosure. After used for a long period of time, a broken portion of a chain consisting of the link units 1 is easy to replace. Moreover, the link units 1 may have different colors so that the end-user is able to construct a personalized colorful chain.

The assembling pin 6 of the first embodiment has other variations respectively shown by imaginary lines in parts (B) to (E) of FIG. 4. The connecting hole 20 of each of the outer chain plates 2 needs to be modified according to different variations of the assembling pin 6.

The assembling pin 6 shown in part (B) of FIG. 4 has a main pin body 61, and two diametrically-enlarged end sections 62 each of which is connected to a respective one of two opposite longitudinal ends of the main pin body 61. One of the end sections 62 has a diameter greater than that of the other one of the end sections 62. The two opposite longitudinal ends of the main pin body 61 are respectively positioned in the second hole portions 202 of the link unit 1.

The assembling pin 6 shown in part (C) of FIG. 4 is similar to that shown in part (B) of FIG. 4, and has a main pin body 61, and two diametrically-enlarged end sections 62 that are connected respectively to two opposite longitudinal ends of the main pin body 61 and that have identical diameters.

The assembling pin 6 shown in part (D) of FIG. 4 has a main pin body 61, two neck sections 63 each of which is connected to a respective one of two opposite longitudinal ends of the main pin body 61 and has a diameter smaller than that of the main pin body 61, and two end sections 62 each of which is connected to an end of a respective one of the neck sections 63 distal from the main pin body 61. Each of the neck sections 63 has a diameter slightly greater than the width of the corresponding neck portion 203 so as to be positioned in the corresponding second hole portions 202 of the link unit 1.

The assembling pin 6 shown in part (E) of FIG. 4 is similar to that shown in part (D) of FIG. 4. One of the end sections 62 has a diameter greater than that of the other one of the end sections 62, and greater than that of the first hole portion 201 of the connecting hole 20 of each of the outer chain plates 2.

To sum up, since the connecting hole 20 of each of the outer chain plates 2 is aligned with the connecting hole 20 of the other one of the outer chain plates 2 in an axial direction of the assembling pin 21, and since the connecting hole 20 of each of the outer chain plates 2 has the neck portion 203 located between the first and second hole portions 201, 202 thereof, the assembling pin 6 can be easily inserted into the connecting holes 20 of the outer chain plates 2, and can be positioned in the second hole portion 202 of each of the outer chain plates 2. As a result, the link unit 1 of this disclosure is easy to reassemble. Moreover, the end-user can easily construct a chain having personalized colors and length. Compared with the link unit 7 of the conventional chain in FIG. 16, the outer chain plates 2 are not easy to be moved relative to each other since the connecting pin 5 of the link unit 1 is riveted to the outer chain plates 2 in advance.

Referring to FIGS. 5 to 7, a second embodiment of the link unit 1 according to the disclosure is similar to the first embodiment. What is different is that the one of the outer chain plates 2 further has an abutment surface 221 that is recessed from the outer side surface 25 thereof and that extends around the second hole portion 202 thereof, and two limiting portions 222 that are connected respectively to two intersections of the abutment surface 221 and the first hole portion 201 (i.e., the limiting portions 222 are respectively connected to two opposite circumferential ends of the abutment surface 221). A distance between the limiting portions 222 is d2 (see FIG. 6). In this embodiment, d2 is greater than d1.

For the connecting hole 20 of the one of the outer chain plates 2, the first hole portion 201 has a diameter greater than that of the second hole portion 202. For the connecting hole 20 of the other one of the outer chain plates 2, the first hole portion 201 has a diameter substantially the same as that of the second hole portion 202.

The diameter of the end section 62 of the assembling pin 6 connected to the neck section 63 is greater than the distance (d2) between the limiting portions 222, and is greater than the diameter of the second hole portion 202 of the one of the outer chain plates 2.

The assembly of the second embodiment is similar to that of the first embodiment. The assembling pin 6 is first inserted through two adjacent link units 1, and then the link units 1 are pulled away from each other to position the assembling pin 6 within the second hole portions 202 of the corresponding link unit 1. The end section 62 of the assembling pin 6 connected to the neck section 63 abuts against the abutment surface 221 of the one of the outer chain plates 2 of the corresponding link unit 1, and the end section 62 of the assembling pin 6 distal from the neck section 63 abuts against the outer side surface 25 of the other one of the outer chain plates 2 of the corresponding link unit 1.

After the assembly of the link units 1, the end of the main pin body 61 of the assembling pin 6 distal from the neck section 63 is prevented from moving past the neck portion 203 of the other one of the outer chain plates 2 of the corresponding link units 1 so as to be positioned in the corresponding second hole portion 202, and the end section 62 of the assembling pin 6 connected to the neck section 63 is prevented from moving past the limiting portions 222 of the one of the outer chain plates 2 of the corresponding link units 1 so as to be positioned in the corresponding second hole portion 202. In a variation of the first embodiment, the one of the outer chain plates 2 may have only one limiting portion 222, and the neck portion 203 may have a different configuration as long as the assembling pin 6 is positioned in the second hole portion 202 of each of the outer chain plates 2.

The assembling pin 6 of the second embodiment may have various variations similar to those shown by imaginary lines in parts (B) to (E) of FIG. 4.

Referring to FIGS. 8 and 9, a third embodiment of the link unit 1 according to the disclosure is similar to the second embodiment. What is different is that each of the outer chain plates 2 of the third embodiment has the abutment surface 221.

The assembling pin 6 has a main pin body 61, two neck sections 63 each of which is connected to a respective one of two opposite longitudinal ends of the main pin body 61, and two end sect ions 62 each of which is connected to an end of a respective one of the neck sections 63 distal from the main pin body 61. The end sections 62 of the assembling pin 6 respectively abut against the abutment surfaces 221 of the outer chain plates 2.

The assembly of the third embodiment is similar to that of the first embodiment. The assembling pin 6 is first inserted through two adjacent link units 1, and then the link units 1 are pulled away from each other (see the arrows in FIG. 8) to respectively position the neck sections 63 of the assembling pin 6 within the second hole portions 202 of the corresponding link unit 1.

The assembling pin 6 of the third embodiment may have various variations similar to those shown by imaginary lines in parts (B), (C) and (E) of FIG. 4. It should be noted that when the assembling pin 6 is configured as that shown in part (E) of FIG. 4, one of the abutment surfaces 221 corresponding to the larger one of the end sections 62 needs to be correspondingly enlarged.

Referring to FIGS. 10 and 11, a fourth embodiment of the link unit 1 according to the disclosure is similar to the second embodiment. The one of the outer chain plates 2 that has the abutment surface 221 further has two spaced-apart recesses 223 each of which is connected between the first and second hole portions 201, 202 and has a connecting surface 224 and a slide surface 225. The slide surface 225 of each of the recesses 223 is recessed from and parallel to the outer side surface 25. The connecting surface 224 of each of the recesses 223 is arc-shaped, is connected between the first and second hole portions 201, 202, and extends from the outer side surface 25 to the corresponding slide surface 225. A distance between the outer side surface 25 of the one of the outer chain plates 2 and the slide surface 225 of a corresponding one of the recesses 223 is smaller than that between the outer side surface 25 and the abutment surface 221. In this embodiment, the assembling pin 6 may have various variations similar to those shown by imaginary lines in parts (B) to (E) of FIG. 4. The width (d1) of the neck portion 203 of the connecting hole 20 of the one of the outer chain plates 2 may be greater than the diameter of the neck section 63 (see FIG. 4) of the assembling pin 6, such that the neck section 63 can be easily moved into the second hole portion 202.

Referring to FIGS. 4, 10 and 11, in the assembly of the fourth embodiment, the recesses 223 are configured to permit the corresponding end section 62 of the assembling pin 6 to pass therethrough. Therefore, the assembling pin 6 can be moved into the second hole portion 202 when an inner end surface of the corresponding end section 62 that faces toward the main pin body 61 is located outside of the slide surface 225 of each of the recesses 223. Since the inner end surface of the corresponding end section 62 needs not be located outside of the outer side surface 25 to permit the assembling pin 6 to be moved into the second hole portion 202, the length of the assembling pin 6 can be reduced.

FIG. 12 illustrates a fifth embodiment of the link unit 1 according to the disclosure. The connecting hole 20 of each of the outer chain plates 2 further has an intermediate hole portion 204 that is connected between the neck portion 203 and the first hole portion 201.

FIG. 13 illustrates a sixth embodiment of the link unit 1 according to the disclosure. For each of the outer chain plates 2, the center (A) of the through hole 211, the curvature center (C) of the first hole portion 201 and the curvature center (B) of the second hole portion 202 are not collinear. The curvature center (C) of the first hole portion 201 does not reside on an imaginary line (L) passing through the center (A) of the through hole 211 and the curvature center (B) of the second hole portion 202.

Figure 3:
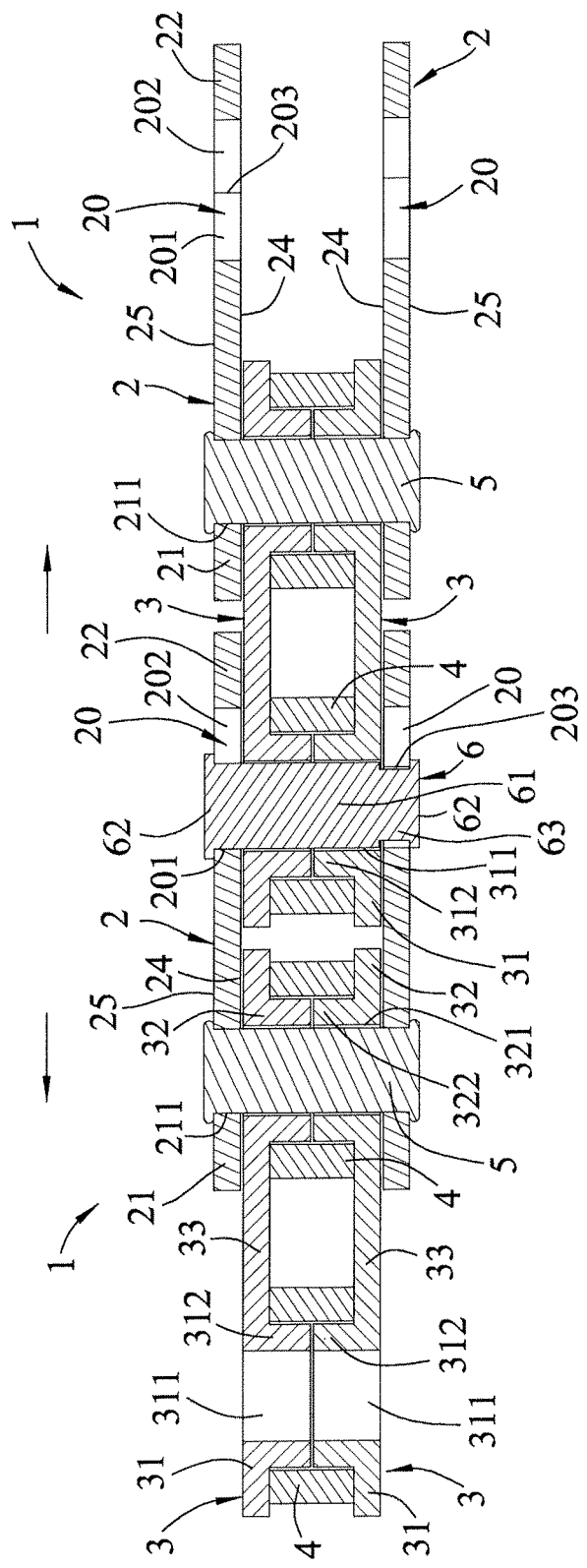
FIG. 3 is a schematic sectional view of the chain in FIG. 1 illustrating an assembling process of the chain.

With further reference to FIGS. 3 and 4, in assembly, the assembling pin 6 is moved into the second hole portion 202 in the direction of a line that passes through the curvature center (C) of the first hole portion 201 and the curvature center (B) of the second hole portion 202. In operation, the assembling pin 6 is subjected to a force that pushes the assembling pin 6 toward the center (A) of the through hole 211 in the direction of the imaginary line (L). Since the curvature center (C) of the first hole portion 201 does not reside on the imaginary line (L), the assembling pin 6 is not likely to be moved into the first hole portion 201, so as to enhance the steadiness of the link unit 1 of this disclosure.

Referring to FIG. 14, a seventh embodiment of the link unit 1 according to the disclosure further includes two bush members 34 for substituting the annular flanges 312, 322 of the inner chain plates 3 (see FIG. 3). One of the bush members 34 is press-fitted into the first through hole 311 of the inner chain plates 3. The other one of the bush members 34 is press-fitted into the second through holes 411 of the inner chain plates 3.

FIG. 15 illustrates an eighth embodiment of the link unit 1 according to the disclosure. The first end section 21 of each of the outer chain plates 2 is formed with the connecting hole 20. The eighth embodiment includes an additional assembling pin 6 for substituting the connecting pin 5 (see FIG. 3).

Each of the assembling pins 6 has a main pin body 61, two neck sections 63 each of which is connected to a respective one of two opposite longitudinal ends of the main pin body 61, and two end sections 62 each of which is connected to an end of a respective one of the neck sections 63 distal from the main pin body 61. The diameters of the end sections 62 of each of the assembling pins 6 are different from each other. The assembling pins 6 are arranged such that the larger end sections 62 of the assembling pins 6 are alternately disposed at two lateral sides of the link units 1 for enhancing the structural strength of the chain consisting of the eighth embodiments of the disclosure.

While the disclosure has been de scribed in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A link unit comprising:
    two spaced-apart outer chain plates, each of said outer chain plates having a first end section, a second end section that is spaced apart from said first end section, an inner side surface that faces the other one of said outer chain plates, and an outer side surface that is opposite to said inner side surface, said first end section of each of said outer chain plates having a through hole that is configured as a circular hole, said second end section of each of said outer chain plates having a connecting hole that has a first hole portion, a second hole portion, and a neck portion located between said first and second hole portions; and
    an assembling pin inserted removably through said connecting hole of each of said outer chain plates, and capable of being prevented from moving past said neck portion of each of said outer chain plates so as to be positioned in said second hole portion of each of said outer chain plates;

wherein said first and second hole portions of each of said outer chain plates are respectively aligned with said first and second hole portions of the other one of said outer chain plates in an axial direction of said assembling pin, said through hole of each of said outer chain plates being aligned with said through hole of the other one of said outer chain plates in the axial direction of said assembling pin;

wherein said link unit further comprises two spaced-apart inner chain plates and a connecting pin, each of said inner chain plates having a first end section, and a second end section that is spaced apart from said first end section of said inner chain plate, said second end sections of said inner chain plates being disposed between said first end sections of said outer chain plates, said connecting pin being inserted through said second end sections of said inner chain plates and said through holes of said first end sections of said outer chain plates, and having two opposite end portions that hold the first end sections of said outer chain plates together; and wherein said assembling pin has a main pin body, a neck section that is connected to a longitudinal end of said main pin body and that has a diameter smaller than that of said main pin body, and two end sections that are connected respectively to an end of said neck section distal from said main pin body and another longitudinal end of said main pin body distal from said neck section, said neck section of said assembling pin having a diameter greater than the width of said neck portion of said connecting hole of one of said outer chain plates.

2. The link unit as claimed in claim 1, further comprising two bush members connected between said first end sections of said inner chain plates and between said second end sections of said inner chain plates.

3. The link unit as claimed in claim 1, wherein said first end section of each of said inner chain plates has a first annular flange that extends toward said first end section of the other one of said inner chain plates, said second end section of each of said inner chain plates having a second annular flange that extends toward said second end section of the other one of said inner chain plates.

4. The link unit as claimed in claim 1, said end sections of said assembling pin respectively abut against said outer side surfaces of said outer chain plates, said first hole portion of said connecting hole of each of said outer chain plates having a diameter greater than that of said main pin body of said assembling pin and that of one of said end sections of said assembling pin.

5. The link unit as claimed in claim 4, wherein the diameter of said first hole portion of said connecting hole of each of said outer chain plates is smaller than that of the other one of said end sections of said assembling pin.

6. The link unit as claimed in claim 1, wherein one of said outer chain plates further has an abutment surface that is recessed from said outer side surface of the one of said outer chain plates and that extends around said second hole portion of the one of said outer chain plates.

7. The link unit as claimed in claim 6, wherein the one of said outer chain plates further has at least one limiting portion that is connected to an circumferential end of said abutment surface and that abuts against an end of said assembling pin for positioning said assembling pin in said second hole portion thereof and preventing said assembling pin from moving into said first hole portion thereof.

8. The link unit as claimed in claim 1, wherein each of said outer chain plates further has an abutment surface that is recessed from said outer side surface of said outer chain plate and that extends around said second hole portion of said outer chain plate.

9. The link unit as claimed in claim 1, wherein the center of said through hole and the curvature centers of said first and second hole portion of said connecting hole of each of said outer chain plates being not collinear.

* * * * *